United States Patent
Sevigny et al.

(10) Patent No.: US 10,372,408 B2
(45) Date of Patent: Aug. 6, 2019

(54) REMOTE CONTROL DEVICES AND RELATED DEVICES AND SYSTEMS

(71) Applicant: Bose Corporation, Framingham, MA (US)

(72) Inventors: Jonathan Christopher Sevigny, Wayland, MA (US); Vikram Singh, Marlborough, MA (US); Anthony John Marino, Milford, MA (US); Trevor Lai, Wayland, MA (US)

(73) Assignee: Bose Corporation, Framingham, MA (US)

( * ) Notice: Subject to any disclaimer, the term of this patent is extended or adjusted under 35 U.S.C. 154(b) by 1223 days.

(21) Appl. No.: 14/023,075

(22) Filed: Sep. 10, 2013

(65) Prior Publication Data

US 2015/0074527 A1 Mar. 12, 2015

(51) Int. Cl.
*G06F 3/16* (2006.01)
*G06F 3/0481* (2013.01)
*G06F 3/0484* (2013.01)
*G11B 19/02* (2006.01)

(52) U.S. Cl.
CPC .......... *G06F 3/165* (2013.01); *G06F 3/04817* (2013.01); *G06F 3/04842* (2013.01); *G11B 19/025* (2013.01); *G11B 19/027* (2013.01)

(58) Field of Classification Search
CPC ... G06F 3/165; G06F 3/04842; G06F 3/04817
See application file for complete search history.

(56) References Cited

U.S. PATENT DOCUMENTS

| | | | |
|---|---|---|---|
| 7,624,277 B1 * | 11/2009 | Simard | G06F 21/31 704/270 |
| 2005/0114374 A1 * | 5/2005 | Juszkiewicz | G11B 19/025 |
| 2005/0146444 A1 * | 7/2005 | Allen et al. | 340/825.24 |
| 2007/0124772 A1 | 5/2007 | Bennett et al. | |
| 2007/0230963 A1 * | 10/2007 | Juszkiewicz | 398/107 |
| 2008/0183757 A1 * | 7/2008 | Dorogusker | G06Q 30/0241 |
| 2009/0153289 A1 * | 6/2009 | Hope | G06F 3/04883 340/5.1 |
| 2011/0070777 A1 * | 3/2011 | Krampf et al. | 439/638 |
| 2015/0018992 A1 * | 1/2015 | Griffiths et al. | 700/94 |
| 2015/0172744 A1 * | 6/2015 | Kim | H04N 21/4227 725/37 |

OTHER PUBLICATIONS

International Search Report and Written Opinion dated Dec. 4, 2014 for International application No. PCT/US2014/054758.

* cited by examiner

*Primary Examiner* — Kevin L Young
*Assistant Examiner* — Parmanand D Patel

(57) ABSTRACT

A remote control device is provided for controlling an audio playback device. The remote control device includes an input region that is operable to select from a plurality of entities for providing audio content to the audio playback device, and a display for displaying information associated with the entities for providing audio content. The remote control device is configured to request image files from the audio playback device for display on the display. The image files correspond to the entities for providing audio content.

20 Claims, 14 Drawing Sheets

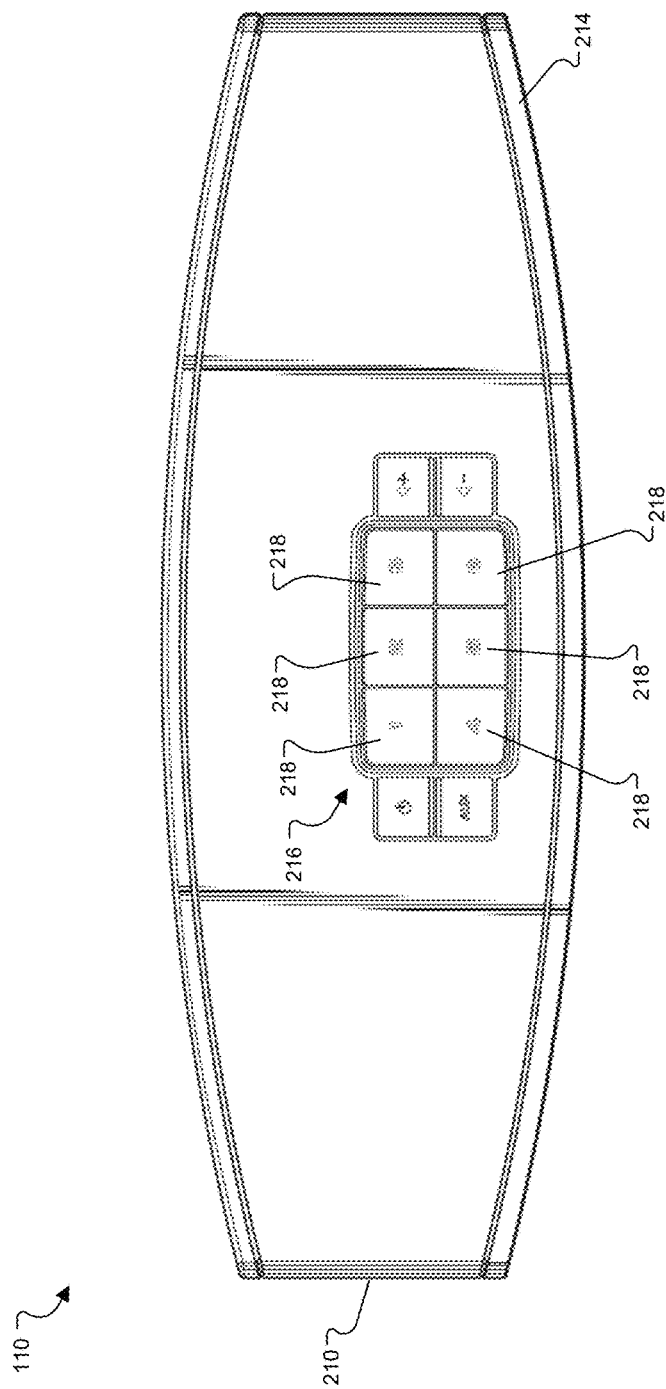

REMOTE CONTROL DEVICES AND RELATED DEVICES AND SYSTEMS

BACKGROUND

This disclosure relates to remote control devices and related systems and devices, and, particularly, to remote control devices for use in controlling audio playback devices in audio systems.

SUMMARY

This disclosure is based, in part, on the realization that a relatively simple remote control device can be given the appearance of having fancy display capabilities (such as true type font rendering ability, font scaling ability, and the ability to render different languages) by performing heavy lifting (e.g., rendering) on a separate console (e.g., an audio playback device) that then delivers display ready, pre-rendered images to the remote control device for storage and display. In some cases, when an image (e.g., text rendered as an image) is to be displayed on the remote control device, the console sends an index number corresponding to one of the pre-rendered images to the remote control device, which then displays the corresponding image.

This can be particularly beneficial where the remote control device and the console communicate over a low-bandwidth connection, such as Bluetooth LE.

In one aspect, a remote control device is provided for controlling an audio playback device. The remote control device includes an input region that is operable to select from a plurality of entities for providing audio content to the audio playback device, and a display for displaying information associated with the entities for providing audio content. The remote control device is configured to request image files from the audio playback device for display on the display. The image files correspond to the entities for providing audio content.

Implementations may include one of the following features, or any combination thereof.

In some implementations, the remote control device is configured to: send a status request message to the audio playback device; and receive a status response message, responsive to the status request message, from the audio playback device, the status response message comprising a list of the image files for synchronization of the remote control device with the audio playback device.

In certain implementations, in response to the status response message, the remote control device is configured to send a separate get file request message to the audio playback device for each of the image files identified in the list of the image files. Each get file request message includes a request for a corresponding one of the image files.

In some implementations, the remote control device is configured to maintain a list of preset assignments, and the status response message includes preset information, which remote control device utilizes for updating the list of preset assignments.

In certain implementations, the input region includes a plurality of preset indicators. Each preset indicator is configured to have assigned to it an entity associated with one of a plurality of digital audio sources for providing audio content to the audio playback device.

In some implementations, the preset indicators on the remote control device correspond to a set of preset indicators on the audio playback device.

In certain implementations, the remote control device is configured to synchronize preset assignments with the audio playback device. Each of the preset assignments represents an assignment of an entity associated with one of the digital audio sources to a corresponding one of the preset indicators.

In some implementations, the remote control device includes a storage device. The remote control device is configured to: receive compressed image files from the audio playback device; decompress the compressed image files; and store the decompressed image files on the storage device.

In certain implementations, the remote control device is configured to send a confirmation message to the audio playback device after each of the image files is saved on the storage device.

In some implementations, the image files include text that has been rendered as an image.

In another aspect, an audio playback device is configured to operably connect to a plurality of digital audio sources and is controllable via a remote control device. The audio playback device includes a digital-to-analog converter that is configured to receive a digital representation of audio content from the digital audio sources and convert to analog form; and an electro-acoustic transducer. The audio playback device is configured to send image files to the remote control device for storage and display on the remote control device.

Implementations may include one of the above and/or below features, or any combination thereof.

In some implementations, the audio playback device is configured to operably connect to a plurality of digital audio sources, and the audio playback device also includes a set of user-selectable preset indicators and each indicator being configured to have assigned to it an entity associated with the plurality of digital audio sources.

In certain implementations, the image files correspond to preset assignments. Each of the preset assignments representing an assignment of an entity associated with one of the digital audio sources to a corresponding one of the preset indicators.

In some implementations, the image files include icons associated with the digital audio sources.

In certain implementations, the image files are stored in compressed form on the audio playback device.

In some implementations, the audio playback device is configured to send the image files to the remote control device in response to a get file request message received from the remote control device.

In certain implementations, the audio playback device includes a database that tracks which image files are stored on the remote control device.

In some implementations, the database tracks which image files the remote control device has previously stored and which image files the remote control device needs from the audio playback device.

In certain implementations, the audio playback device is configured to update the database in response to communications from remote control device indicating that needed image files have been successfully stored on the remote control device.

In some implementations, the audio playback device is configured to communicate with the remote control device via a Bluetooth LE connection.

In certain implementations, the audio playback device is configured to extract text from the database and render the extracted text as an image. The image files include the rendered image of the extracted text All examples and features mentioned above can be combined in any technically possible way. Other features and advantages will be apparent from the description and the claims.

BRIEF DESCRIPTION OF THE DRAWINGS

FIGS. 2A and 2B are perspective and top plan views, respectively, of an exemplary audio playback device from the audio system of FIG. 1.

DETAILED DESCRIPTION

System Overview

Figure 1:
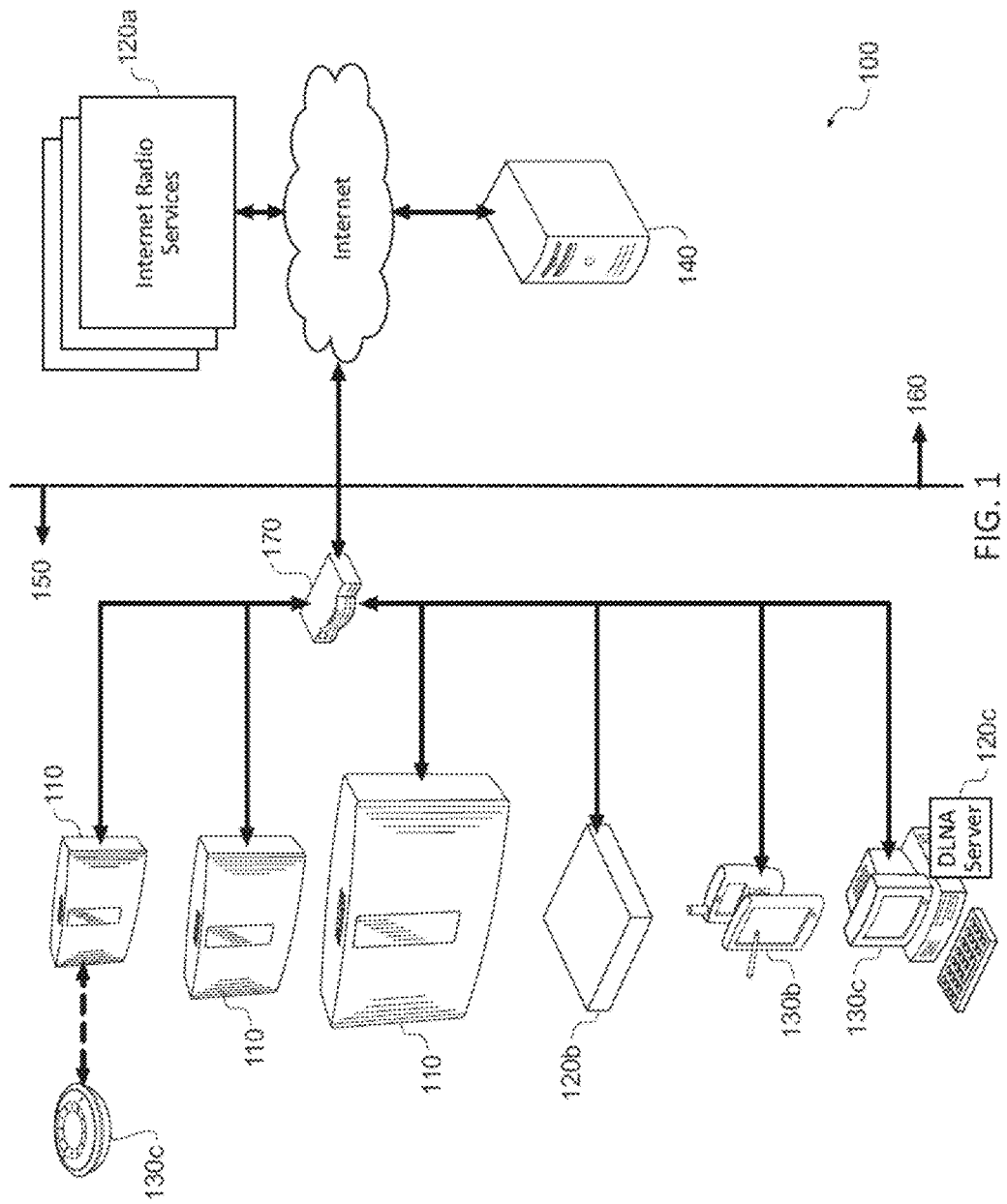
FIG. 1 is a schematic view of an audio system that facilitates synchronization of presets among various system devices.

Referring to FIG. 1, an audio system 100 for the delivery of digital audio (e.g., digital music) provides for easy, quick access to a variety of digital audio sources through the use of preset assignments. At a very high level, there are four main categories of devices in the audio system 100: (i) audio playback devices 110; (ii) digital audio sources 120a, 120b, 120c (collectively referenced as 120); controllers 130a, 130b, 130c (collectively referenced as 130); and a server 140.

The audio playback devices 110 are electronic devices which are capable of rendering audio content. These devices can access stored audio content (e.g., remotely stored audio content) and stream it for playback. In some cases, the audio playback devices 110 may also be capable of playing locally stored content. These devices render audio with the help of audio codecs and digital signal processors (DPSs) available within. The audio playback devices 110 may include wireless speaker packages, Wi-Fi enabled televisions, home theater systems (e.g., with built-in Wi-Fi), etc.

The audio playback devices 110 can communicate with each other. For example, each audio playback device 100 can communicate with the other audio playback devices 110 within the audio system 100 for synchronization. This can be a synchronization of device settings, such as synchronization of preset assignments, or, for synchronization of playback (e.g., such that all or a subset of the audio playback devices 110 play the same content simultaneously and synchronously).

The digital audio sources 120 are devices and/or services that provide access to one or more associated entities for supplying content (e.g., audio streams) to the audio playback devices 110, and which can be located remotely from the audio playback devices 110. An "Entity," as used herein, refers to a grouping or collection of content for playback. Exemplary entities include Internet radio stations and user defined playlists. "Content" is data (e.g., an audio track) for playback. "Associated entity" refers to an entity that is associated with a particular audio source. For example, if the digital audio source 120 is an Internet music service such as Pandora®, an example associated entity would be a radio station provided by Pandora®.

For the purposes of the audio system 100, audio streams are considered to be data. They are processed as digital information that is converted to analog before presentation. Data streaming is the method by which data is moved from an audio source 120 to an audio playback device 110. Typically, there are two models for this data movement, push and pull. The audio system 100 is capable of managing this audio (data) streaming in both fashions; descriptions of these processes are as follows.

In a push model, the digital audio source 120 will move the data to the audio playback device 110 at a pace that it desires. The recipient (e.g., one of the audio playback devices 110) of the data will acknowledge the data and the digital audio source 120 will provide more data. This model requires the digital audio source 120 to be managing the throughput characteristics of the audio system 100. In a pull model, the audio playback device 110 will request data from the digital audio source 120 at a rate it desires. This allows the audio playback device 110 to read ahead if data is available.

The digital audio sources 120 each maintain a repository of audio content which can be chosen by the user to play. The digital audio sources 120 are based on the Digital Living Network Alliance® (DLNA) or other Web based protocols similar to the Hypertext Transfer Protocol (HTTP). Some of the devices and services in this category include Internet based music services 120a such as Pandora®, Spotify®, and vTuner®; network-attached storage (NAS) devices 120b, and a media server daemon 120c (e.g., provided as a component of a computer-based controller).

The digital audio sources 120 include user defined playlists of digital music files available from network audio sources such as network-attached storage (NAS) devices 120b, and a DLNA server 120c which may be accessible to the audio playback devices 110 over a local area network such as a wireless (Wi-Fi) or wired (Ethernet) home network 150, as well as Internet radio sites 120a such as Pandora®, vTuner®, Spotify®, etc., which are accessible to the audio playback devices 110 over a wide area network 160 such as the Internet.

The controllers 130 are responsible for controlling the audio playback devices 110 and for browsing the audio sources 120 in the audio system 100. Some of the devices in this category include desktop computers, laptop computers, and mobile devices such as smart phones and tablets. These devices control the audio playback devices 110 via a wireless communication interface (e.g., IEEE 802.11 b/g, Bluetooth LE, infrared, etc.). The controllers 130 serve as an online management tool for a user's network enabled audio playback devices 110. The controllers 130 provide interfaces which enable to the user to perform one or more of the following: setup a connection to a Wi-Fi network; create an audio system account for the user, sign into a user's audio system account and retrieve information; add or remove an audio playback device 110 on a user's audio system account; edit an audio playback device's name, and update software; access the audio sources (via the audio playback devices 110); assign an entity (e.g., a playlist or radio station) associated with one of the audio sources 120 to a preset indicator; browse and select recents, where "recents" refers to recently accessed entities; use transport controls (play/pause, next/skip, previous), view "Now Playing" (i.e., content currently playing on an audio playback device 110) and album art; and adjust volume levels.

In some cases, the controllers 130 may include network controllers 130a, 130b and auxiliary controllers 130c (also referred to as remote control devices 130c). The network controllers 130a, 130b are controllers that communicate with the audio playback devices 110 over a wireless (Wi-Fi) network connection. The network controllers can include primary network controllers 130a and secondary network controllers 130b. The primary network controllers 130a can be utilized for: connecting an audio playback device 110 to a Wi-Fi network (via a USB connection between the audio playback device 110 and the primary network controller 130a); creating a system account for the user; setting up music services; browsing of content for playback; setting preset assignments on the audio playback devices 110; transport control (e.g., play/pause, fast forward/rewind, etc.) for the audio playback devices 110; and selecting audio playback devices 110 for content playback (e.g., single room playback or synchronized multi-room playback). Devices in the primary network controller category can include desktop and laptop computers.

The secondary network controllers 130b may offer some, but not all, of the functions of the primary network controllers 130a. For example, the secondary network controllers 130b may not provide for all of the account setup and account management functions that are offered by the primary network controllers 130a. The secondary network controllers 130b may be used for: music services setup; browsing of content; setting preset assignments on the audio playback devices; transport control of the audio playback devices; and selecting audio playback devices 110 for content playback: single room or synchronized multi-room playback. Devices in the secondary network controller category can include mobile devices such as smart phones and tablets.

The auxiliary controllers 130c (a/k/a "remote control devices 130c") communicate wirelessly (e.g., via Bluetooth low energy (BTLE) or IR) with an associated (e.g., paired) one of the audio playback devices (item 110, FIG. 1). The auxiliary controllers 130c may offer limited functionality. The auxiliary controllers 130c may be used for: browsing of content; setting of preset assignments on the associated one of the audio playback devices 110; selecting of one of the preset assignments on the associated one of the audio playback devices 110; and transport control (play/pause, skip forward, skip back, etc.) of the associated audio playback device 110.

The server 140 is a cloud-based server which contains (e.g., within an account database) information related to a user's audio system account. This includes user account information such as the list of the audio playback devices 110 within the system 100, device diagnostic information, preset assignments, etc. The server 140 will be connected to by the audio playback devices 140 and by the controllers 130 (e.g., by primary network controllers) for the purpose of preset management, as well as management of audio sources 120 and management of the user's audio system account. Generally, the controllers 130 (e.g., network controllers 130a, 130b) will login to the server 140 with a user's login details and 'sync down' the required information to work with.

The audio playback devices 110 and one or more of the controllers 130 are coupled to a local area network (LAN) 150. Other devices such as one or more of the digital audio sources (e.g., a network-attached storage (NAS) device 120b) may also be coupled to the LAN 150. The LAN 150 may be a wired network, a wireless network, or a combination thereof. In one example, the devices (e.g., audio playback devices 110 and controllers 130 (e.g., primary and secondary controllers 130a, 130b)) within the LAN 150 are wirelessly coupled to the LAN 150 based on an industry standard such as IEEE 802.11 b/g. The LAN 150 may represent a network within a home, an office, or a vehicle. In the case of a residential home, the audio playback devices 110 may be arranged in different rooms (e.g., kitchen, dining room, basement, etc.) within the home. The devices within the LAN 150 connect to a user supplied access point 170 (e.g., a router) and subsequently to a wide area network (WAN) 160 (e.g., the Internet) for communication with the other digital audio sources 120 (Internet based music services 120a) and the server 140. In some cases, the LAN 150 may comprise plural LANs in different locations each including one or more of the audio playback devices 110 and each in communication with the wide area network.

Notably, the audio system 100 can provide for the management of presets (a/k/a "preset assignments") and recents. Presets are a set of (e.g., six) user-defined shortcuts to content, intended to provide quick access to entities associated with the digital music sources 120 from (1 of 6) preset indicators present on each of the audio playback devices 110. In some cases, the preset indicators can be hardware buttons. Alternatively, the preset indicators may be virtual buttons defined by regions on a touch sensitive display. The individual preset indicators can be denoted with numerical identifiers.

The preset indicators on the audio playback devices 110 provide access to their respectively assigned entities irrespective of the associated digital audio source. More specifically, the preset indicators can provide for single press access to the respectively assigned entities, irrespective of the digital audio source. That is, a single press of a preset indicator will start the streaming and rendering of content from an entity assigned to that preset indicator regardless of the audio source providing that entity. In that regard, the presets are said to be source agnostic in that they behave in the same manner regardless of the audio source. In some cases, the single press access can be facilitated with the distribution of tokens for accessing account based audio sources which normally require a user to login with account credentials.

The presets can be global or local at the user's option. The user can select the global or local option, e.g., during set up of the user's system account. If the user's account is set to provide for global presets, the preset assignments will be synchronized on all the audio playback devices 110 across the audio system 100 such that preset assignments on any one of the audio playback devices correspond to respective preset assignments on each of the other audio playback devices (e.g., such that preset indicator "1" on a first one of the audio playback devices is assigned to the same entity as preset indicator "1" on all of the other audio playback devices 110 in the audio system 100), and, such that, if one of the preset assignments is changed on one of the audio playback devices 110, each of the other audio playback devices 110 is automatically updated such that a corresponding change is made to a corresponding preset assignment on each of the other audio playback devices. The synchronization of the preset assignments is managed through a combination of communications between the audio playback devices 110 with the server 140, and communications among the audio playback devices 110 themselves. A copy of the global preset assignments is stored locally on each audio playback device 110 associated with the user's account, and a copy of the global preset assignments is also maintained on the server 140.

The "recents" (a/k/a "recents list") is a list of entities that is populated from content that the user has chosen to play. Recent entities can include Internet radio stations (e.g., for Pandora® and vTuner®), and a "group of tracks" selected for Spotify® and stored music. The "group of tracks" is a "parent" of a currently playing track, based on whatever the user either browsed to or searched for (e.g., Album, Playlist, Genre>All, Artist>All, etc.). The controllers 130, and, in some cases, the audio playback devices 110, can provide access to the recents by displaying the recents list to the user and allowing the user to browse the recents list and select entities therefrom.

The recents can be limited to a predetermined number of entities (e.g., 50-100 entities). Alternatively or additionally, the recents may be limited by date. For example, the recents may be limited to entities accessed by the user within the last day, month, year, etc., with older entries being purged from the list.

As with the presets, the recents can be global (applied to all audio playback devices associated with a user's account) or local (device-specific) at the user's option. The same local/global toggle can be leveraged for both the presets and the recents. That is, one "global/local" setting can dictate whether the presets and recents are global or local. In some cases, the default setting is "global." Additional details regarding the management of presets and recents are disclosed in U.S. application Ser. No. 13/833,394, filed Mar. 15, 2013, which is incorporated herein by reference in its entirety.

Audio Playback Devices

Figure 2A:
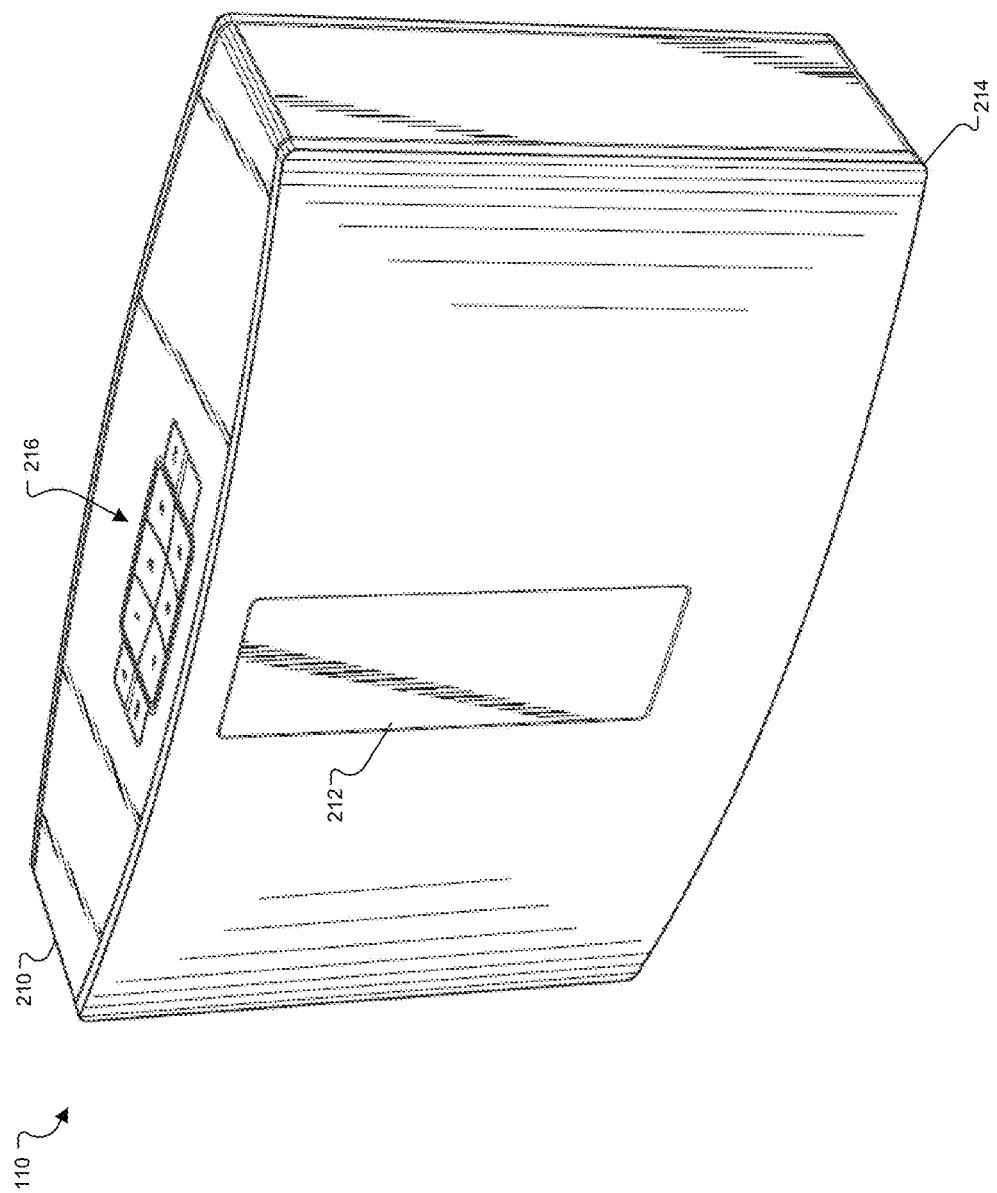
Figure 2C:
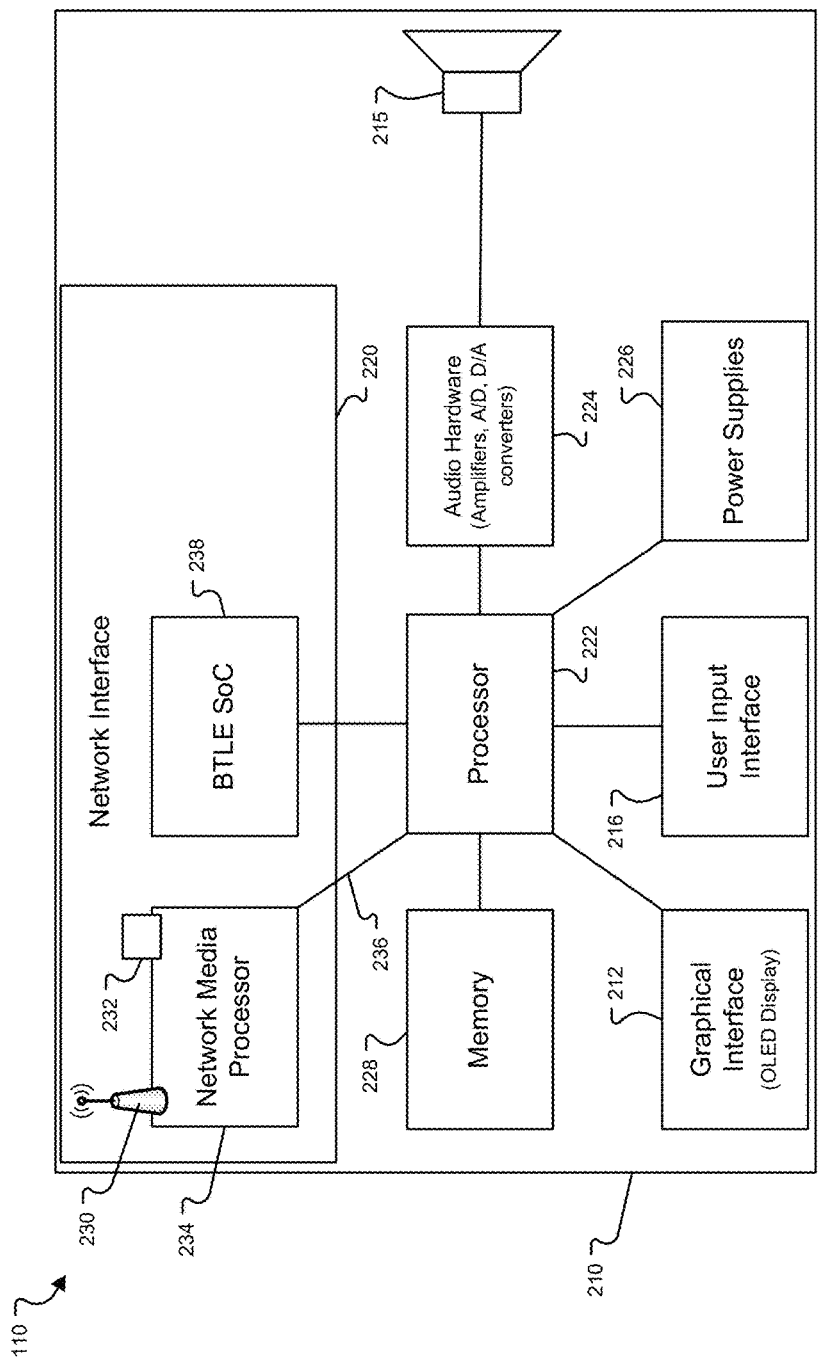
FIG. 2C is a block diagram of the audio playback device of FIG. 2A.

An exemplary audio playback device 110 will now be described in greater detail with reference to FIGS. 2A through 2C. Referring to FIG. 2A, an audio playback device 110 includes an enclosure 210 and on the enclosure 210 there resides a graphical interface 212 (e.g., an OLED display) which can provide the user with information regarding currently playing ("Now Playing") music and information regarding the presets. A screen 214 conceals one or more electro-acoustic transducers 215 (FIG. 2C). The audio playback device 110 also includes a user input interface 216. As shown in FIG. 2B2B, the user input interface 216 includes a plurality of preset indicators 218, which are hardware buttons in the illustrated example. The preset indicators 218 (numbered 1-6) provide the user with easy, one press access to entities assigned to those buttons. That is, a single press of a selected one of the preset indicators 218 will initiate streaming and rendering of content from the assigned entity.

The assigned entities can be associated with different ones of the digital audio sources (items 120a, 120b, 120c, FIG. 1) such that a single audio playback device 110 can provide for single press access to various different digital audio sources. In one example, the assigned entities include at least (i) user-defined playlists of digital music and (ii) Internet radio stations. In another example, the digital audio sources include a plurality of Internet radio sites, and the assigned entities include individual radio stations provided by those Internet radio sites.

Notably, the preset indicators 218 operate in the same manner, at least from the user's perspective, regardless of which entities are assigned and which of the digital audio sources provide the assigned entities. That is, each preset indicator 218 can provide for single press access to its assigned entity whether that entity is a user-defined playlist of digital music provided by an NAS device or an Internet radio station provided by an Internet music service.

With reference to FIG. 2C, the audio playback device 110 also includes a network interface 220, a processor 222, audio hardware 224, power supplies 226 for powering the various audio playback device components, and memory 228. Each of the processor 222, the graphical interface 212, the network interface 220, the processor 222, the audio hardware 224, the power supplies 226, and the memory 228 are interconnected using various buses, and several of the components may be mounted on a common motherboard or in other manners as appropriate.

The network interface 220 provides for communication between the audio playback device 110 and the controller (e.g., items 130a-c, FIG. 1), the server (item 140, FIG. 1), the audio sources (items 120, FIG. 1) and other audio playback devices 110 via one or more communications protocols. The network interface 220 may provide either or both of a wireless interface 230 and a wired interface 232. The wireless interface 230 allows the audio playback device 110 to communicate wirelessly with other devices in accordance with a communication protocol such as such as IEEE 802.11 b/g. The wired interface 232 provides network interface functions via a wired (e.g., Ethernet) connection.

In some cases, the network interface 220 may also include a network media processor 234 for supporting Apple Air-Play® (a proprietary protocol stack/suite developed by Apple Inc., with headquarters in Cupertino, Calif., that allows wireless streaming of audio, video, and photos, together with related metadata between devices). A suitable network media processor is the DM870 processor available from SMSC of Hauppauge, N.Y. The network media processor 234 provides network access (i.e., the Wi-Fi network and/or Ethernet connection can be provided through the network media processor 234) and AirPlay® audio. Air-Play® audio signals are passed to the processor 222, using the I²S protocol (an electrical serial bus interface standard used for connecting digital audio devices), for downstream processing and playback. Notably, the audio playback device 110 can support audio-streaming via AirPlay® and/or DLNA's UPnP protocols, and all integrated within one device. In some cases, one of the preset indicators 218 can be assigned an entity in which audio content is streamed via Apple AirPlay®, and another one of the preset indicators 218 on the same device can be assigned to an entity in which audio content is streamed via DLNA's UPnP protocols.

All other digital audio coming from network packets comes straight from the network media processor 234 through a USB bridge 236 to the processor 222 and runs into the decoders, DSP, and eventually is played back (rendered) via the electro-acoustic transducer(s) 215.

The network interface 210 can also include a Bluetooth low energy (BTLE) system-on-chip (SoC) 738 for Bluetooth low energy applications (e.g., for wireless communication with a Bluetooth enabled controller (item 130c, FIG. 1)). A suitable BTLE SoC is the CC2540 available from Texas Instruments, with headquarters in Dallas, Tex.

Streamed data pass from the network interface 220 to the processor 222. The processor 222 can execute instructions within the audio playback device (e.g., for performing, among other things, digital signal processing, decoding, and equalization functions), including instructions stored in the memory 228. The processor 222 may be implemented as a chipset of chips that include separate and multiple analog and digital processors. The processor 222 may provide, for example, for coordination of other components of the audio playback device 110, such as control of user interfaces, applications run by the audio playback device 110. A suitable processor is the DA921 available from Texas Instruments.

The processor 222 provides a processed digital audio signal to the audio hardware 224 which includes one or more digital-to-analog (D/A) converters for converting the digital audio signal to an analog audio signal. The audio hardware 224 also includes one or more amplifiers which provide amplified analog audio signals to the electroacoustic transducer(s) 215 for playback. In addition, the audio hardware 224 may include circuitry for processing analog input signals to provide digital audio signals for sharing with other devices in the acoustic system 100.

The memory 228 stores information within the audio playback device 110. In this regard, the memory 228 may store account information, such as the preset and recent information discussed above. The memory 228 may also provide storage for "tokens" for facilitating single press access to the digital audio sources 120 (e.g., the Internet radio services of FIG. 1). A token, as used herein, is a unique identifier that may be provided by the digital audio source 120 and which allows the digital audio source 120 to recognize the audio playback device 110 as being associated with a user's account with the digital audio source 120 and without requiring the user to enter credentials (e.g., user name, password, etc.) each time the audio playback device 110 attempts to access the digital audio source 120.

The memory 228 may include, for example, flash memory and/or non-volatile random access memory (NVRAM). In some implementations, instructions (e.g., software) are stored in an information carrier. The instructions, when executed by one or more processing devices (e.g., the processor 222), perform one or more processes. The instructions can also be stored by one or more storage devices, such as one or more computer- or machine-readable mediums (for example, the memory 228, or memory on the processor). The instructions may include instructions for performing decoding (i.e., the software modules include the audio codecs for decoding the digital audio streams), as well as digital signal processing and equalization.

The instructions may also include instructions for enabling certain "browsing" functionality. That is, at least in some cases, the controllers (items 130a-c, FIG. 1) serve as graphical remote controls for the audio playback devices 110 and do not communicate with the digital audio sources 120 (FIG. 1) directly, but, instead, communicate with the digital audio sources 120 via the audio playback devices 110.

Controllers

Figure 3:
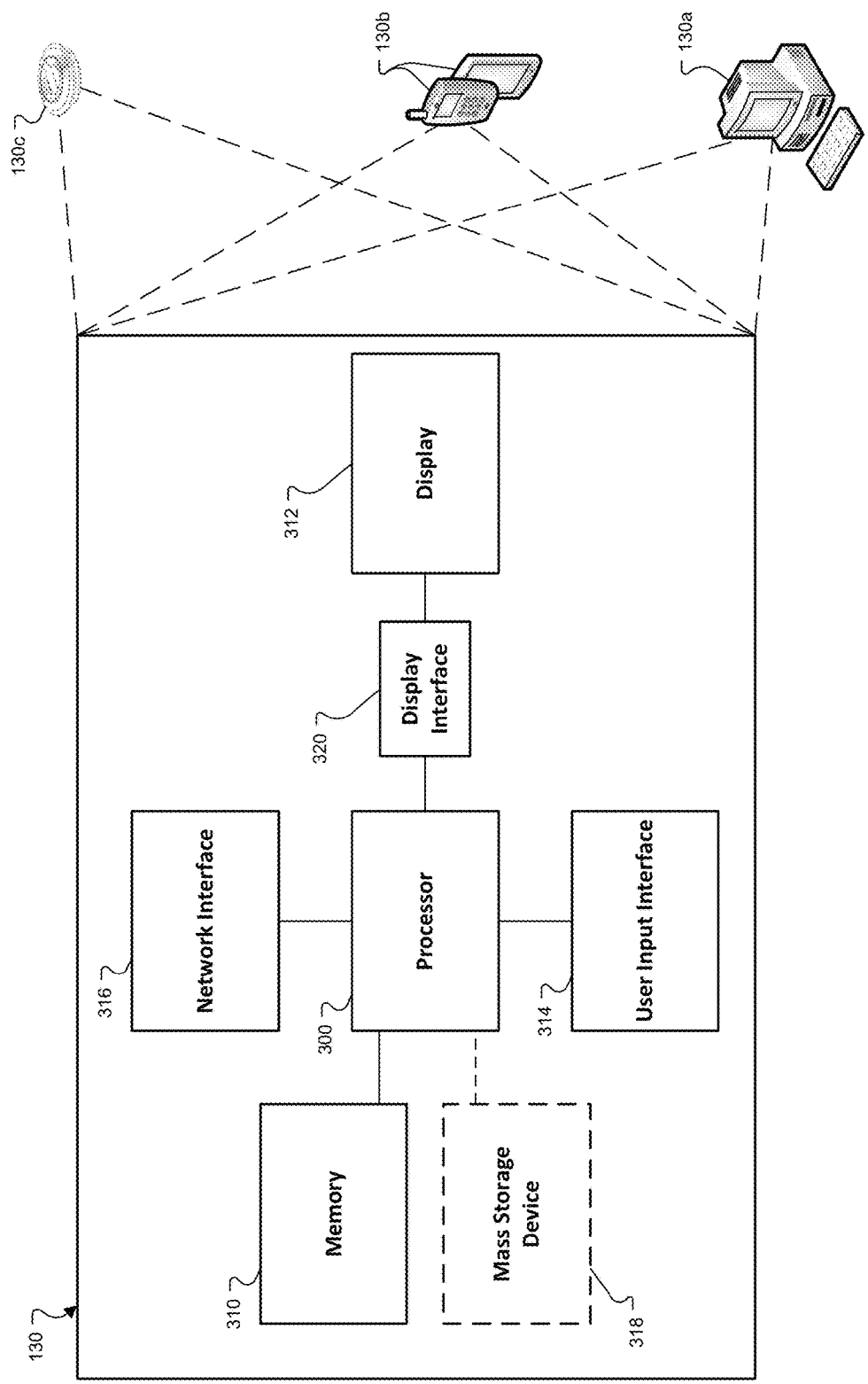
FIG. 3 is a block diagram of an exemplary controller from the audio system of FIG. 1.

Referring to FIG. 3, an exemplary controller 130 includes a processor 300, a memory 310, a display 312, a user input interface 314, and a network interface 316, among other components. The controller 130 may also be provided with a mass storage device 318, such as a hard drive, a microdrive, or other device, to provide additional storage. Each of the processor 300, the memory 310, the display 312, and the network interface 316 are interconnected using various buses, and several of the components may be mounted on a common motherboard or in other manners as appropriate.

The processor 300 can execute instructions (e.g., software) within the controller 130, including instructions stored in the memory 310 or in a secondary storage device (e.g., mass storage device 318). The processor 300 may be implemented as a chipset of chips that include separate and multiple analog and digital processors. The processor 300 may provide, for example, for coordination of other components of the controller 130, such as control of user interfaces, applications run by the controller 130, and network communication by the controller 130. The processor 300 may communication with a user through the display 312 and the user input interface 314.

The processor 300 may communicate with the user through a display interface 1020 coupled to the display 312. The display 312 may include an LCD monitor, or a touch sensitive display (e.g., in the case of a mobile device). The display interface 1020 may comprise appropriate circuitry for driving the display 312 to preset graphical and other information to the user.

The user input interface 314 may include one or more user input devices such as a keyboard, a pointer device such as a mouse, and/or a touch sensitive display. In some cases, the same device (e.g., a touch sensitive display) may be utilized to provide the functions of the display 312 and the user input interface 314.

The network interface 316 facilitates wireless communication (e.g., Wi-Fi, Bluetooth, IR, etc.) with one or more of the audio playback devices (item 110, FIG. 1) via a corresponding network interface (item 220, FIG. 2C) on the audio playback device 110.

The memory 310 stores information within the controller 130. In some implementations, the memory 310 is a volatile memory unit or units. In some implementations, the memory 310 is a non-volatile memory unit or units. The memory 310 may also be another form of computer-readable medium, such as magnetic or optical disk.

The mass storage device 318 is capable of providing mass storage for the controller 130. In some implementations, the mass storage device 318 may be or contain a computer readable medium, such as a floppy disk device, a hard disk device, an optical disk device, or a tape device, a flash memory or other similar solid state memory device, or an array of devices.

Instructions (e.g., software) can be stored in an information carrier. The instructions, when executed by one or more processing devices (e.g., the processor 300), perform one or more processes. The instructions can also be stored by one or more storage devices such as computer- or machine-readable mediums (for example, the memory 310, the storage device 318, or memory in the processor 300).

Figure 4A:
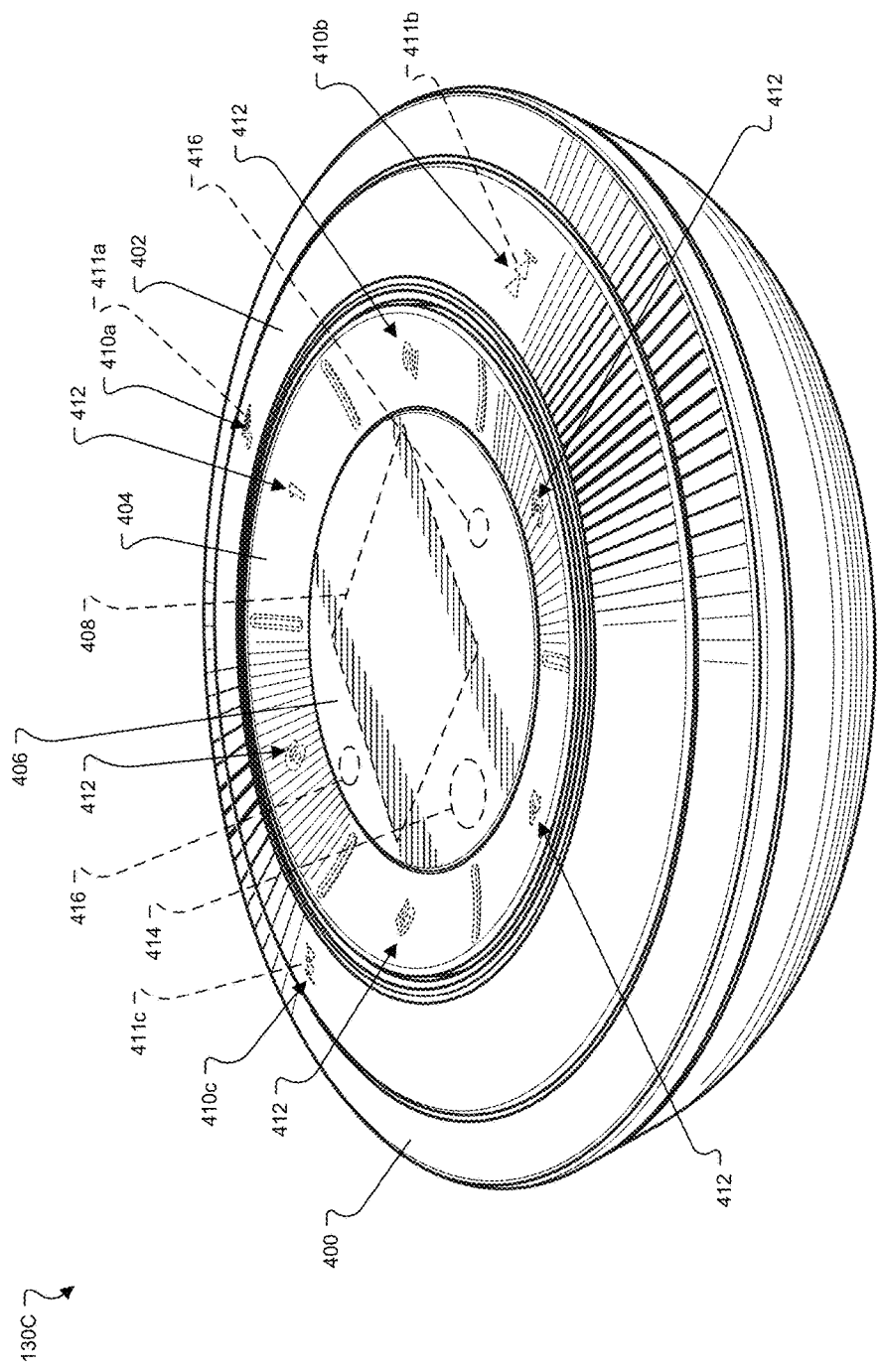
FIG. 4A is a perspective view a remote control device.

FIG. 4A illustrates an exemplary auxiliary controller 130c (as referred to as a "remote control device"). The remote control device 130c can enable the user to initiate a music experience from an associated one of the audio playback devices 110 (FIG. 1), e.g., via Bluetooth LE. Recents and presets that are saved on the associated audio playback device and/or associated with a user's system account are also available on the remote control device 130c. The remote control device 130c allows a user to browse and select recents and presets for providing content for rendering on the associated audio playback device.

The remote control device 130c includes a plurality of concentrically arranged user interface elements. In the illustrated implementation, the user interface elements include a volume dial 400 (also referred to as the "volume ring"); a top cover 402; an inner ring 404; a center button 406; and a display 408.

The volume ring 400 can be activated by rotating the volume ring 400 (e.g., clockwise to increase volume and counterclockwise to reduce volume) to adjust the volume of the associated one of the audio playback devices. The top cover 402 includes a plurality of discrete buttons which, in the illustrated example, are implemented as capacitive touch buttons 410a, 410b, 410c (collectively referenced as 410) each with a backlit icon 411a, 411b, 411c (collectively referenced as 411). Alternatively or additionally, the discrete buttons can comprise one or more hardware buttons (e.g., displaceable buttons for actuating associated switches). In the illustrated example, the capacitive touch buttons 410 include a presets/recents modal button 410a, a skip forward button 410b, and a skip back button 410c.

When in presets mode, the inner ring 404 serves as the absolute location of a plurality of preset indicators 412 (six shown), which correspond to the preset indicators on the associated one of the audio playback devices. When in recents mode, a circular swiping motion along the inner ring 404 allows the user to browse the recents (e.g., a recents list provided by the associated audio playback device) via the display 408, and select a recent, for playback on the associated audio playback device, by pressing down on the inner ring 404.

The center button 406 includes a circular lens that masks the display 408. A central push on the center button 406 can power on or pause and unpause the associated audio playback device's audio. A press-and-hold on the center button 406 shuts down the associated audio playback device.

The remote control device 130c may also include a proximity detector for detecting the presence of a user's hand near the surface of the remote control device 130c. The proximity detector may include a proximity sensor 414 and a pair of infrared emitters 416 all mounted below the lens. The emitters 416 fire upward through the lens, and, when IR is reflected (e.g., off a user's hand reaching toward the remote control device 130c), the proximity sensor 414 picks that up. The proximity detector can be utilized to allow the remote control device to "wake up" (i.e., power up) from a low power (a/k/a "sleep") mode.

The remote control device 130a may be configured to enter the low power mode after a predetermined period (e.g., 5 seconds to 15 seconds) of non-use. The proximity detector can then be utilized to trigger the remote control device 130c to power up from the low power mode when the presence of the user is detected.

The proximity detector functions such that the remote control device 130c wakes up (i.e., enters a normal power state, e.g., in which the one or functions that were deactivated when entering the low power mode are re-activated) when a user goes to use it without actually having to touch the remote control device 130c; i.e., so that the user's first contact with the remote control device 130c can be used for content (e.g., music) selection. In that regard, the proximity detector can also help to facilitate "one touch" access to music. The idea here is that the user's actions wake the remote control device 130c up from a sleep or low power state before the user actually contacts the remote control device 130c so that the user can access content (e.g., music) with the user's first touch (e.g., by pressing one of the preset indicators 412, FIG. 4A).

The display 408 can be a 1.6 inch diagonal OLED display and can be identical to the display 212 (FIG. 2A) on the associate audio playback device. The display 408 can show information related to presets, recents, current music playing ("Now Playing" music—music being rendered on the associated audio playback device) and system information. The display 408 can be configured to display substantially the same information as the associate audio playback device. This can help to provide a consistent appearance and user experience across the devices. In some cases, the information can be displayed concurrently on the remote control device and on the associated playback device. Additional details of the remote control device may be found in U.S. patent application Ser. No. 14/023,011, filed concurrently herewith, entitled "User Interfaces and Related Devices and Systems", inventors: Michael Andrew Zalisk et al., the entire contents of which are hereby incorporated by reference.

The remote control device 130c can also be configured to display information in substantially the same format as on the associated audio playback device. The information may include information regarding status of the associated playback device, information about music currently playing on the associated device. The information provided on the display can include text and/or icons.

Figure 4B:
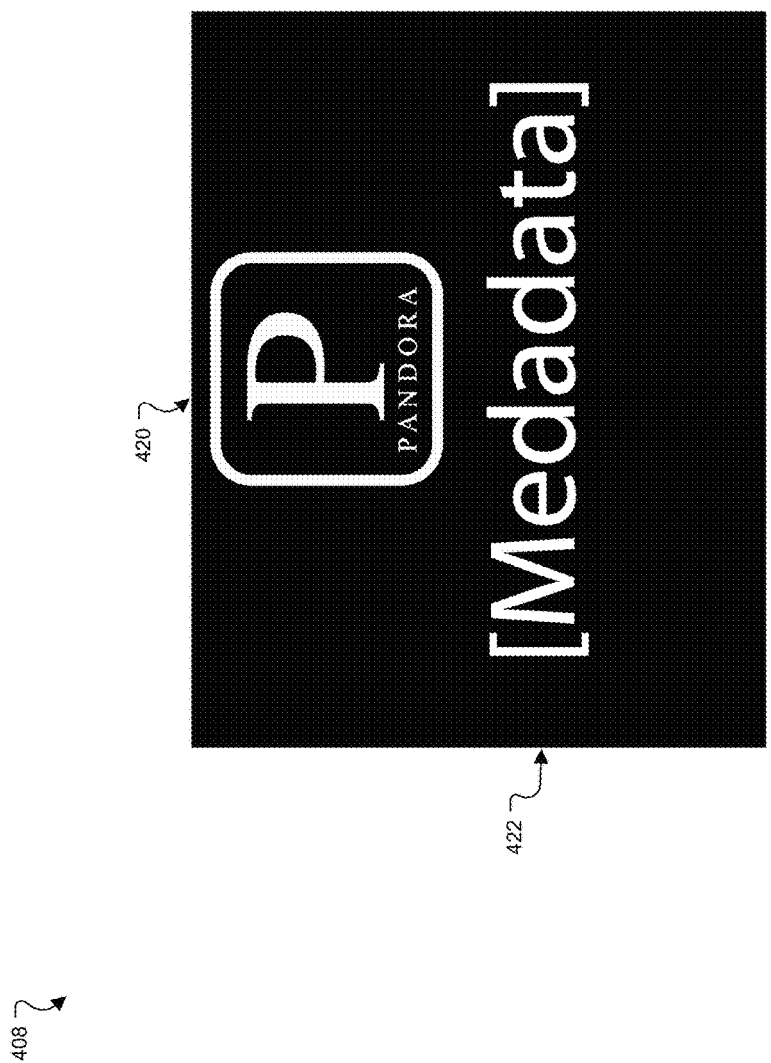
FIG. 4B is a screen shot from a display of the remote control device of FIG. 4A.

For example FIG. 4B illustrates an exemplary format for the display of an entity selected to provide audio content to the associated audio playback device. As shown in FIG. 4B, the display 408 may show information (e.g., an icon) 420 associated with an audio source (Pandora® in the illustrated example), along with text, e.g., metadata 422, associated with an entity associated with the audio source. For example, if the entity is an Internet radio station, then the displayed text may be the station name. If the entity is a user defined playlist, then the displayed text may be the playlist name. The entity may be an entity assigned to one of the presets, or an entity selected from the recents list for providing content for playback on the associated audio playback device.

Notably, all of the content displayed on the remote control device 130c can be provided by the associated one of the playback devices in the form of rendered images. For example, the text for the display 408 can be rendered as an image on the associated playback device, and the audio playback device can then ship the pre-rendered images of the text to the remote control device 130c (e.g., via a Bluetooth LE link) for storage and display. This can provide the remote control device 130c with the appearance of having fancy display capabilities (such as true type font rendering ability, font scaling ability, and the ability to render different languages) even though it does not actually have those capabilities. Instead, the complex, heavy lifting (rendering, etc.) is performed on the associated audio playback device and ready to use graphics are then shipped to and stored on the remote control device 130c.

There are two types of pre-rendered images that are sent from the associated audio playback device to the remote control device. The first image type is non-text. The non-text images can include source icons, such as a Pandora® icon, transport function icons, such as play and pause icons, volume control icons, etc. These non-text images are pre-rendered, run-length encoding (RLE) compressed, and are stored within memory on the associated playback device and sit on the associated audio playback device for the remote control device to download when needed.

The second image type is text. The text images are rendered on the fly on the associated one of the audio playback devices. There are two types of text images. The first text image type is static text. Static text images can include status messages, such as "Syncing audio . . . ,"

"Station unavailable," "Preset Empty," etc. In some cases, the remote control device 130c may be configured to display one of these static messages in response to a message received from the audio playback device. For example, if a connection to a radio station is broken, the audio playback device may instruct the remote control device 130c to display the "Station unavailable" message. In some cases. The remote control device 130c may display a status message, e.g., in response to user input, based on information that the remote control device 130c already has available to it. For example, if a user selects an unassigned preset indicator, the remote control device 130c may automatically display the "Preset Empty" status message.

The second text image type is dynamic text. Dynamic text is text that changes over time. This can include a station name associated with a preset. For example, if a user assigns a new station to one of the preset buttons, the new station name (text) will need to be rendered on the associated one of the playback device and saved as an image file to be sent to the remote control device for storage within memory on the remote control device.

The language for the text may be set by the user during the initial account setup, and may be changed via account settings. The font for the text may be determined by the associated audio playback device. If the associated audio playback device determines that the cannot fit on the OLED display of the remote control device, then it will dynamically change the font to fit the text on the OLED display.

Figure 5:
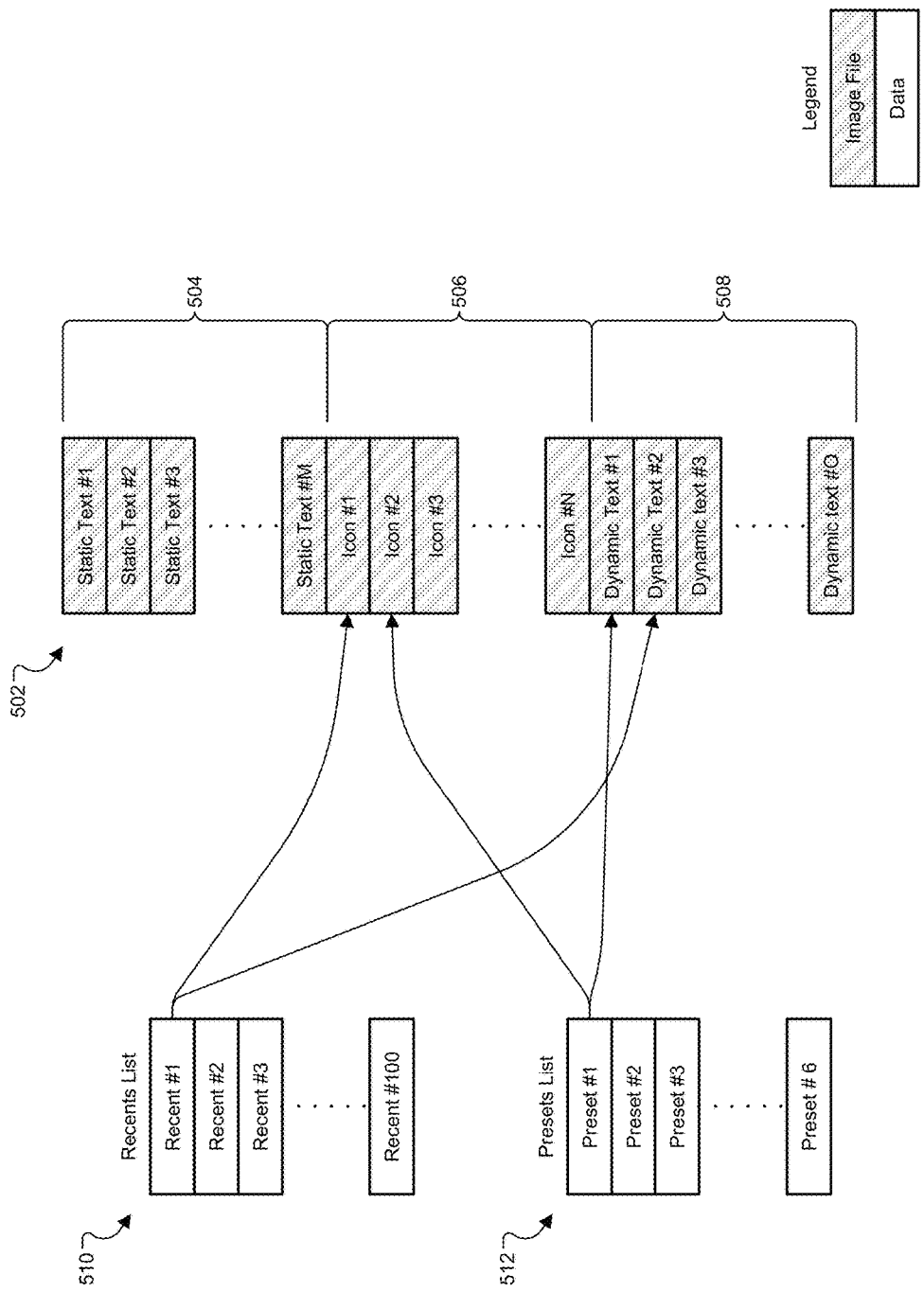
FIG. 5 is a data storage paradigm on the remote control device of FIG. 4A.

FIG. 5 illustrates a data storage paradigm on the remote control device 130c. The remote control device 130c stores the image (graphics) files 502 received from the associated audio playback device in memory on the remote control device. The stored image files 502 include static text image files 504, icon image files 506, and dynamic text image files 508. The remote control device 130c also maintains, in memory, a recents list 510 and a presets list 512. As will be discussed below, these lists are updated via communications with the associated audio playback device.

Each entry in the recents list 510 corresponds to one of the recently accessed entities. The recents list 510 may comprise a fixed number of recently accessed entities. In one example, the recents list includes space for 100 entities. Each entry in the recents list 510 consists of three bytes of data. The first byte identifies the recent number, which corresponds to the position of the entry in the list. In that regard, the recent entries may be arranged/numbered in chronological order with the most recently accessed entity first listed first. The second byte identifies a first image file associated with that entry in the recents list 510. The first image file may be an icon image file. For example, if the entry is a Pandora® radio station, then the second byte would identify the image file for the Pandora® icon. The third byte of data identifies a second image file associated with the entry. The second image file may be a text image file. For example, if the entry is a Pandora® radio station "Bob Marley Radio," then the third byte would identify the image file for the image rendered text "Bob Marley Radio."

Each entry in the presets list corresponds to one of the preset assignments. In one example, the presets list 512 includes space for six (6) preset assignments. As with the recents list 510, each entry in the presets list 512 consists of three bytes of data. The first byte identifies the preset number (i.e., the number of the preset indicator associated with that entry in the presets list 512). The second byte identifies a first image file associated with that entry in the presets list 512. The first image file may be an icon image file. For example, if the corresponding preset assignment is a Pandora® radio station, then the second byte would identify the image file for the Pandora® icon. The third byte of data identifies a second image file associated with the corresponding preset assignment. The second image file may be a dynamic text image file. For example, if the corresponding preset assignment is a Pandora® radio station "Bob Marley Radio," then the third byte would identify the image file for the image rendered text "Bob Marley Radio."

The image files (text and non-text) are named with numbers. The associated audio playback device decides what to name each file and it tracks which files the remote control device has, which files the remote control device does not have, and which files, if any, have changed and need to be re-downloaded by the remote control device. In this regard, the associated audio playback device maintains a database of file name assignments.

Figure 6:
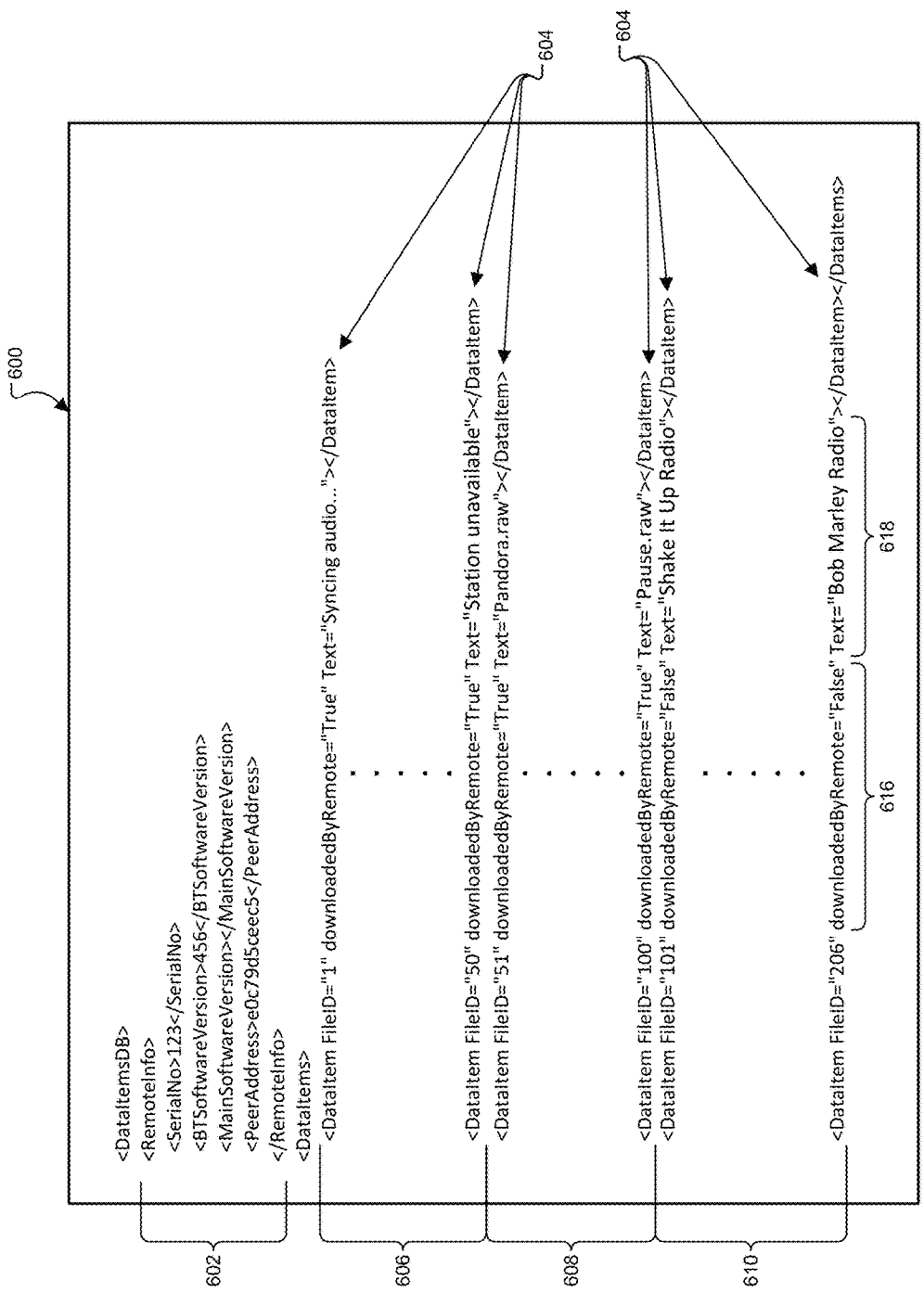
FIG. 6 is a database on an audio playback device for tracking image files on an associated remote control device.

In one implementation, this database is maintained in an XML file on the associated one of the audio playback devices. FIG. 6 illustrates an exemplary .XML file for this purpose. The database 600 includes information 602 regarding what software versions are presently on the remote control device (i.e., based on information received from the remote control device).

The database also includes a plurality of data items 604. Each of these data items 604 corresponds to an image file that the remote control device 130c either has or needs from the associated audio playback device. Each of the data items 604 includes a FileID. In the illustrated example, the FileID is a number. This is the "name" that will be assigned to the corresponding image file. A first predetermined number of the data items are reserved for static text 606; a second predetermined number of the data items 604 are reserved for icons 608; and a third predetermined number of the data items 604 are reserved for dynamic text 610.

In one example, the first 50 data items (i.e., FileID "1" through FileID "50") are reserved for static text; the second 50 data items (i.e., FileID "51" through FileID "100") are reserved for icons; and the next 106 data items (i.e., FileID "101 through FileID "206").

Each of the data items also includes a download indicator 616 which tracks whether or not a corresponding image file has been downloaded by the remote control device 130c. The value for the download indicator 616 is set to "true" if the remote control device 130c already has the corresponding image file, or "false" if the remote control device 130c does not yet have the corresponding image file.

Each of the data items also includes a text indicator 618. For the static text data items, the text indicator 618 has a value that is set to the text that will be rendered. When the remote control device 130c requests the corresponding image file for one of these static text data items from the audio playback device, the audio playback device will extract this text (i.e., the text indicator value) from the .XML document, dynamically render the extracted text as an image file, RLE encode the rendered image, and then send the RLE encoded image file to the remote control device 130c.

For the icon data items, the text indicator 618 has a value that is set to the name of the corresponding pre-rendered, RLE compressed image file (e.g., .raw image file) that is stored in memory on the associated audio playback device. When the remote control device 130c requests the corresponding image file for one of these icon data items from the audio playback device, the audio playback device will send a copy of the associated .raw image file having its file name set as the associated "FileID" value.

For the dynamic text data items, the text indicator 618 has a value that is set to the text that will be rendered. As with the static text data items, when the remote control device 130*c* requests the corresponding image file for one of these dynamic text data items from the audio playback device, the audio playback device will extract this text (i.e., the text indicator value) from the .XML document, dynamically render the extracted text as an image file, RLE encode the rendered image file, and send the RLE encoded image file to the remote control device.

The remote control device 130*c* is updated each time it wakes up from a low powered state and/or each time it is powered on from an off state. This keeps the remote control device 130*c* synchronized with the associated audio playback device (e.g., such that the presets and recents on the remote control device 130*c* match those on the audio playback device).

Figure 7:
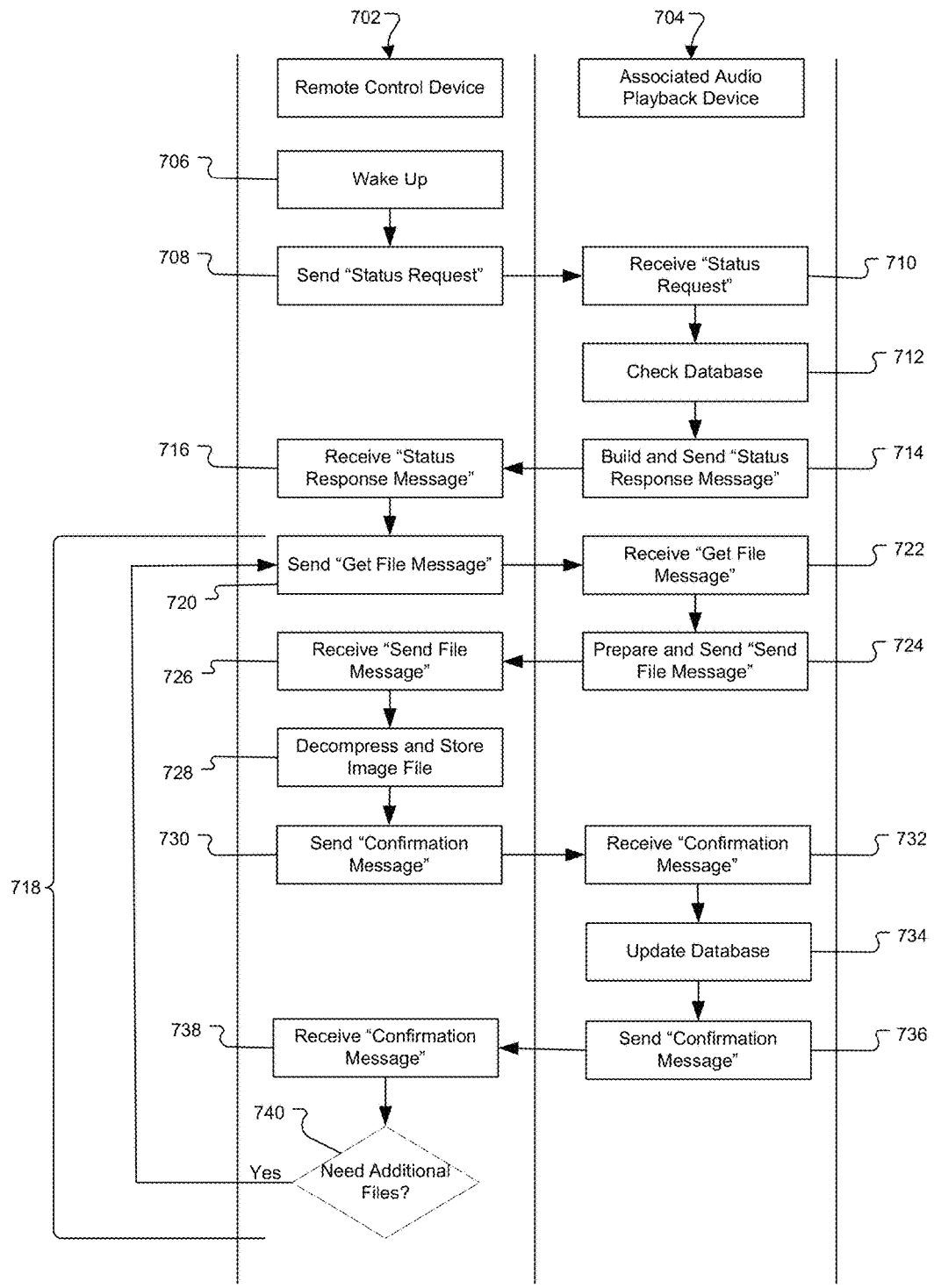
FIG. 7 is a swim lane diagram showing steps for managing image files on a remote control device.

FIG. 7 is a swim lane diagram showing steps for managing image files on the remote control device 130*c*. "Swim lane" diagrams may be used to show the relationship between the various "actors" in the processes and to define the steps involved in the processes. FIG. 7 (and any other swim lane Figures) may equally represent a high-level block diagram of components of the invention implementing the steps thereof. The steps of FIG. 7 (and all the other FIGS. employing swim lane diagrams) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Two swim lanes are shown in FIG. 7 including a lane for the remote control device 702, and a lane for an associated one of the audio playback devices 704.

Figure 8:
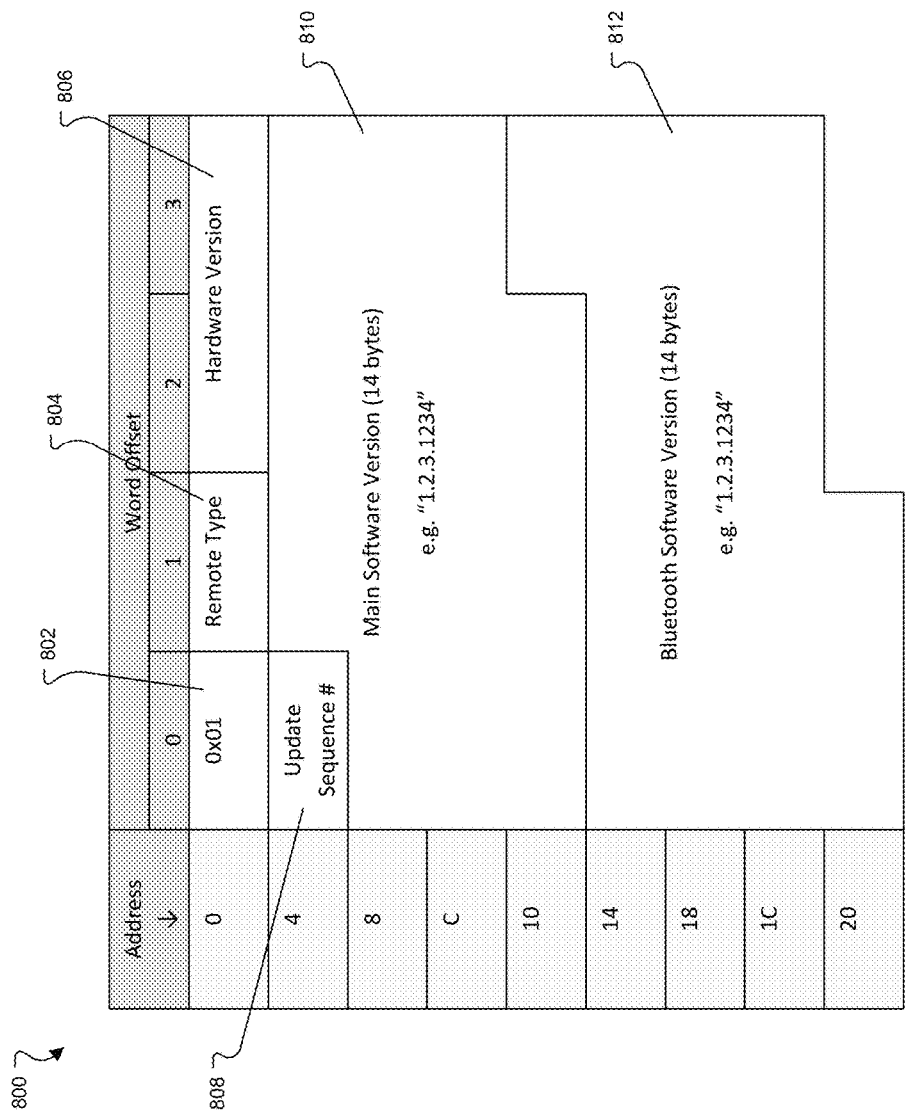
FIG. 8 is an exemplary representation of a status request message.

At step 706, the remote control device is triggered to power up from a low power or off (no power) state, and then sends a status request message (708) to the associated audio playback device. FIG. 8 illustrates an exemplary representation of a status request message 800. The first byte is a message type 802, i.e., what type of message. The status request message 800 also includes an indication of the remote type 804. This may be beneficial where different versions of the remote control device (e.g., with different functionality) are offered. The status request message 800 also includes an indication of the hardware version 806, which is a character string that represents the hardware version of the remote control device. Hardware versions can include, for example, research prototype, development prototype, alpha, beta, and production version.

The status request message 800 may also include an update sequence number 808. This sequence number is updated every time the remote control device and the associate audio playback device complete a status request/status response sequence. The software on the associated audio playback device can key off this incoming sequence number to determine if the synchronization between the playback device and the remote control device has been broken.

The status request message 800 may also include an indication of the main software version 810, and an indication of the Bluetooth software version 812. The main software version indication 810 is a character string that represents the current version of the main software on the remote control device. The Bluetooth software version indication 812 is a character string that represents the current version of the software for Bluetooth communication that is running on the remote control device. The associated audio playback device can use the software version information provided from the remote control device to determine if the remote control device needs a software update. If a software update is needed, the associated audio playback device can instruct the remote control device to perform a software update before the status response is executed.

Referring again to FIG. 7, the associated audio playback device receives the status request message (710); checks the database (XML document) to see what updates are needed (712); and then builds a status response message and sends it to the remote control device (714).

Figure 9:
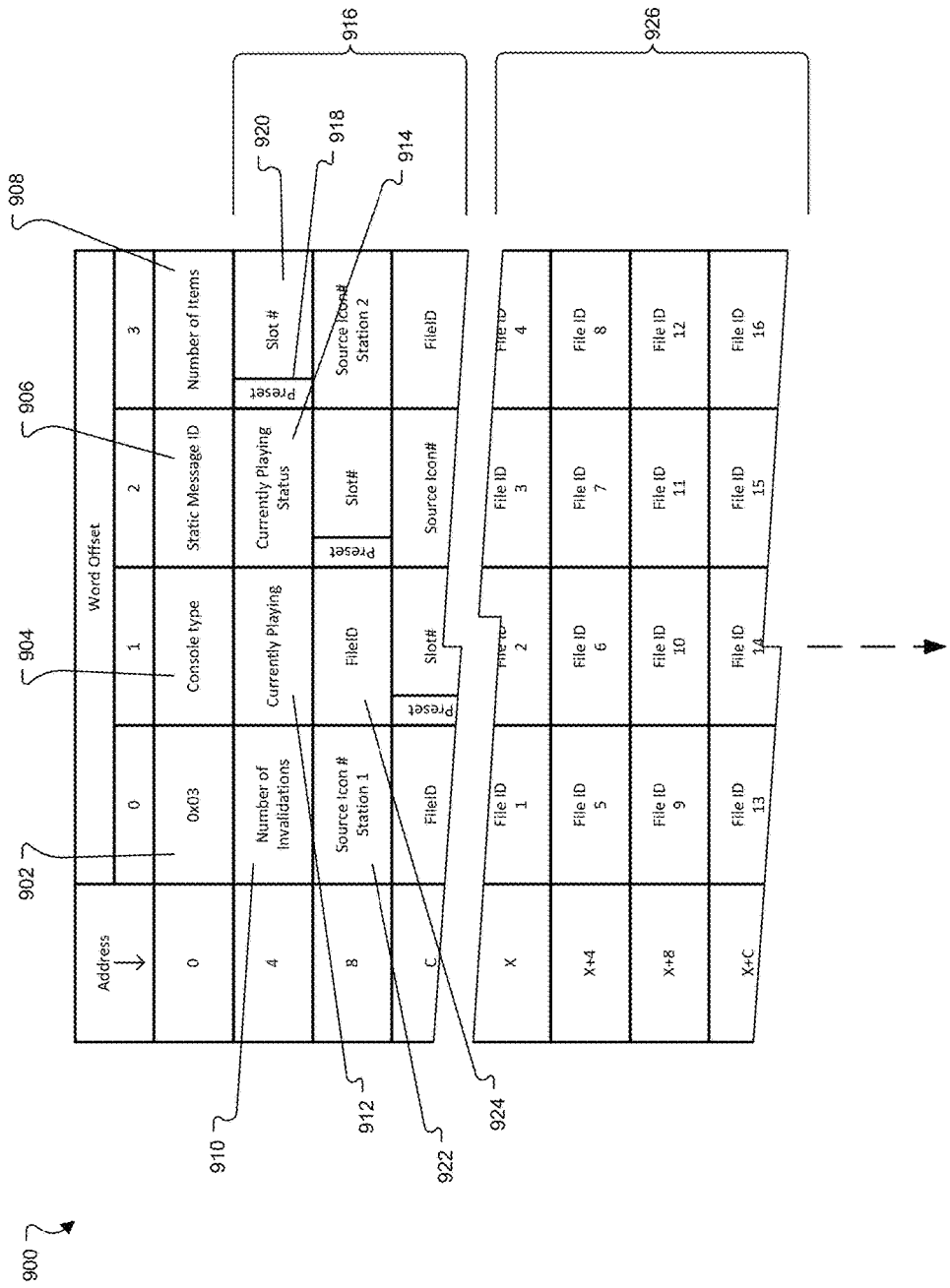
FIG. 9 illustrates an exemplary representation of a status response message.

FIG. 9 illustrates an exemplary representation of a status response message 900. This message is a response to the status request message and provides the remote control device with a list of the image files that it needs to obtain from the associated audio playback device to keep the two devices synchronized, and it also provides the remote control device with the information that it needs to keep its presets and recents lists up to date. The status response message is variable length. The first byte of the status response message 900 is a message type 902. Here the message type is set to "0x03" indicating that this is a status response message. The second byte is the console type 904. The console type indicates the type of audio playback device that the remote control device is connected (e.g., "paired") to. The third byte is a static message ID 906, which can be used to instruct the remote control device to display a static message, such as "updating," or it may be some indication that a connection to one of the audio sources has been lost, etc. The static message ID 906 is reference to an image file stored on the remote control device, for display on the remote control devices display.

Next is the number of items 908. This is the number of image files that the remote control device needs to obtain from the associated audio playback device. Next is the number of invalidations 910, which is the number of image files that need to be refreshed by the remote control device. For example, if any new recents are accessed or if any presets are changed while the remote control device is asleep the new dynamic text may be assigned to a previously used FileID, replacing previously assigned text. As a result, the corresponding image file on the remote control device may become outdated and require refreshing so that it matches with the information on the associated audio playback device. As an example, FileID "101" may have had its associated text change from "Bob Marley Radio" to "James Taylor Radio," e.g., as a result of a change to a preset assignment. The remote control device may have an outdated image file "101" which corresponds to the old text "Bob Marley Radio." Thus, the image file "101" on the remote control device in invalid and needs to be refreshed so as to correspond to the new text "Bob Marley Radio." The number of invalidations 910 is the number of such invalid files on the remote control device which need to be replaced with an updated image file from the associated audio playback device.

The next byte is the currently playing information 912. This identifies an entity that is currently selected to provide audio content to the associated audio playback device. The next byte is the currently playing status 914, which is an indication of the status of the "Now Playing" content, e.g., paused, playing etc.

The next byte is the beginning of a presets and recents section 916. The presets and recents section 916 includes a list of preset and recent items that need to be updated on the remote control device. The list may vary in length depending on how many items require updating on the remote control device.

Each preset and recent item consists of 3 bytes of information. A first bit of the first byte of each preset and recent item is a preset/recent identifier 918. The preset/recent identifier 918 indicates whether the item corresponds to a preset or to a recent. For example, if the first bit is set to a value "1," then the item pertains to a preset. If, instead, the first bit is set to "0" then the item pertains to a recent. The remaining seven bits of the first byte of each preset and recent item is a slot number 920. As mentioned above, there may be six (6) presets and 100 recents. The slot number 920 refers to the corresponding preset number (1-6) or recent number (1-100).

The second byte of each preset and recent item is a source icon number 922. This is the file name (FileID) for the source icon (e.g., Pandora® icon, Spotify icon, etc.) that is to be associated with the preset or recent. This number identifies the data item in the XML database that corresponds to the source icon that is to be associated with that particular preset or recent.

The third byte of each preset and recent item is a FileID 924 for the associated text. This identifies the data item in the XML database that contains the text that is to be associated with that particular preset or recent. This is a one-byte integer specifying which text string file (i.e., an image file of text that has been rendered as an image) to use when displaying this station on the remote control device's display.

After the presets and recents section 916 is a invalidation section 926. Each byte of information in the invalidation section represents a different text string file (i.e., an image file of text that has been rendered as an image) that must be re-downloaded by the remote.

Referring again to FIG. 7, the remote control device receives the status response message (716), and, then there are a series of file exchange sequences 718. There will be a separate file exchange sequence for each image file that needs to be retrieved from the associated audio playback device. For each of the file exchanges, the remote control device sends a get file message to the associated audio playback device (720).

Figure 10:
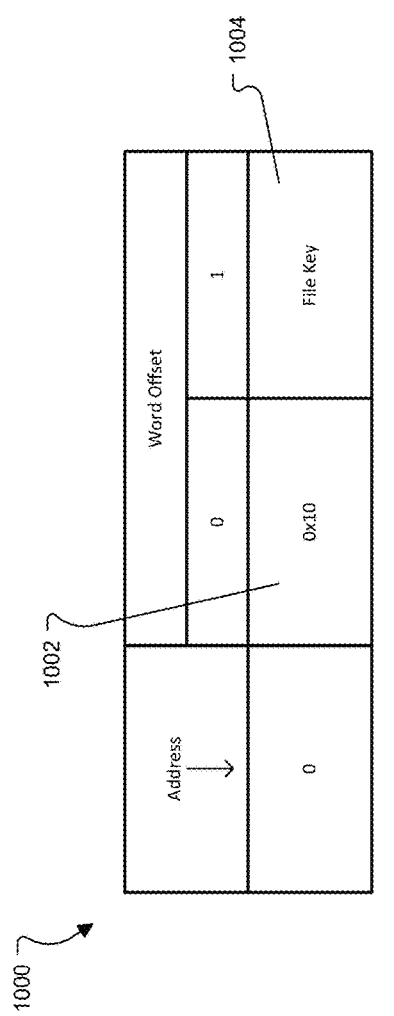
FIG. 10 illustrates an exemplary representation of a get file message.

FIG. 10 illustrates an exemplary representation of a get file message 1000. The get file message 1000 includes a message type 1002. Here the message type is set to "0x10" which indicates that this is a get file message. The get file message 1000 also includes a file key 1004, which identifies the image file that the remote control device is requesting from the associated audio playback device.

Referring again to FIG. 7, the associated audio playback device receives the get file request (722), and, in response, prepares and sends a send file message to the remote control device (724). If the requested file corresponds to text (i.e., static or dynamic text) then the associated audio playback device will extract the corresponding text from the XML database; render it as an image file; compress the rendered image file (e.g., run-length encoding (RLE) compress) the image file; and send the RLE compressed (i.e., RLE encoded) image file in the send file message to the remote control device. If the requested image file corresponds to an icon, then the associated audio playback device will attach the pre-rendered, RLE compressed icon image file to the send file message.

Figure 11:
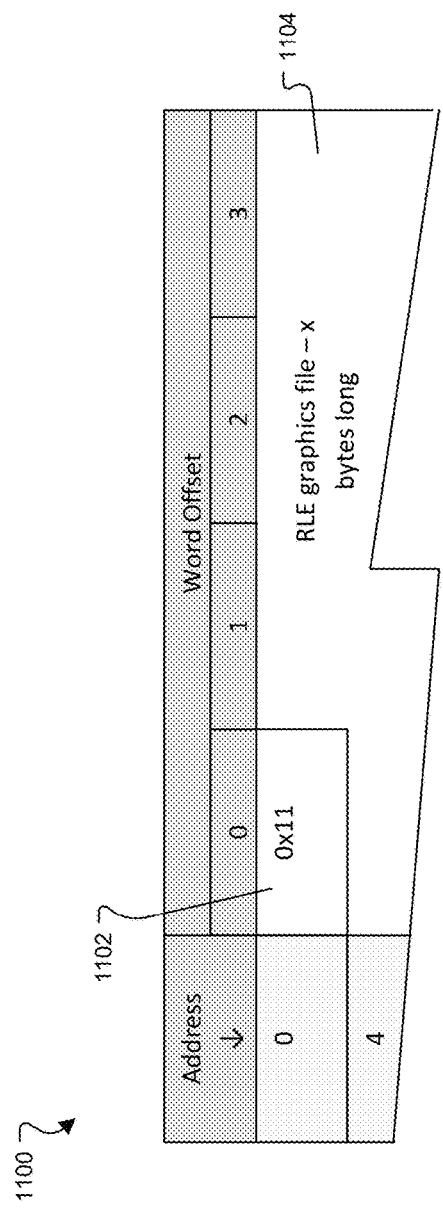
FIG. 11 illustrates an exemplary representation of a send file message.

FIG. 11 illustrates an exemplary representation of a send file message 1100. The send file message 1100 includes a message type 1102. Here the message type is set to "0x11" which indicates that this is a send file message. The get file message 1100 also includes the image file (RLE graphics file) 1104 that was requested by the remote control drive in the get file message 1000 (FIG. 10). The remote control device will have to strip off the message type byte 1102 before storing the data to a file.

Referring again to FIG. 7, the remote control device receives the send file message (726); and decompresses and stores the image file (728) (e.g., as a .raw image file) with its file name set as the associated "FileID" value. Then, after storing the image file, the remote control device sends a confirmation message back to the associated audio playback device indicating that the download was successful (730). The associated audio playback device receives the confirmation message (732) and updates the XML database (734) to reflect that the remote control device now has the corresponding file (i.e., changes "false" value to "true").

Once the associated audio playback device updates the XML database it sends a confirmation message (736) back to the remote control device which lets the remote control device know that the associated audio playback device is ready for the next get file request. The audio playback device receives the confirmation message (738) from the associated audio playback device, and determines (740) whether any further files are needed. If additional files are needed, the remote control device will initiate another file exchange sequence by sending another get file request (720).

A number of implementations have been described. Nevertheless, it will be understood that additional modifications may be made without departing from the scope of the inventive concepts described herein, and, accordingly, other implementations are within the scope of the following claims.

What is claimed is:

1. A remote control device for controlling an audio playback device, the remote control device comprising:
   an input region operable to select from a plurality of entities for providing audio content to the audio playback device;
   a display for displaying information associated with the entities for providing audio content,
   wherein the remote control device is configured to request image files from the audio playback device for display on the display, and
   wherein the image files correspond to the entities for providing audio content,
   wherein the image files comprise text that has been rendered as an image by the audio playback device.

2. The remote control device of claim 1, wherein the remote control device is configured to:
   send a status request message to the audio playback device; and
   receive a status response message, responsive to the status request message, from the audio playback device, the status response message comprising a list of the image files for synchronization of the remote control device with the audio playback device.

3. The remote control device of claim 2, wherein, in response to the status response message, the remote control device is configured to send a separate get file request message to the audio playback device for each of the image files identified in the list of the image files, each get file request message comprising a request for a corresponding one of the image files.

4. The remote control device of claim 2, wherein the remote control device is configured to maintain a list of preset assignments, and wherein the status response message comprises preset information, which remote control device utilizes for updating the list of preset assignments.

5. The remote control device of claim 1, wherein the input region comprises a plurality of preset indicators, each preset indicator is configured to have assigned to it an entity associated with one of a plurality of digital audio sources for providing audio content to the audio playback device.

6. The remote control device of claim 5, wherein the preset indicators on the remote control device correspond to a set of preset indicators on the audio playback device.

7. The remote control device of claim 5, wherein the remote control device is configured to synchronize preset assignments with the audio playback device, wherein each of the preset assignments represents an assignment of an entity associated with one of the digital audio sources to a corresponding one of the preset indicators.

8. The remote control device of claim 1, further comprising a storage device,
wherein the remote control device is configured to:
receive compressed image files from the audio playback device;
decompress the compressed image files; and
store the decompressed image files on storage device.

9. The remote control device of claim 8, wherein the remote control device is configured to send a confirmation message to the audio playback device after each of the image files is saved on the storage device.

10. An audio playback device configured to operably connect to a plurality of digital audio sources and controllable via a remote control device, the audio playback device comprising:
a digital-to-analog converter configured to receive a digital representation of audio content from the digital audio sources and convert to analog form;
an electro-acoustic transducer;
wherein the audio playback device is configured to send image files to the remote control device for storage and display on the remote control device;
wherein the image files comprise text that has been rendered as an image by the audio playback device.

11. The audio playback device of claim 10, wherein the audio playback device is configured to operably connect to a plurality of digital audio sources, and wherein the audio playback device further comprises a set of user-selectable preset indicators and each indicator being assigned to it an entity associated with the plurality of digital audio sources.

12. The audio playback device of claim 11, wherein the image files correspond to preset assignments, each of the preset assignments representing an assignment of an entity associated with one of the digital audio sources to a corresponding one of the preset indicators.

13. The audio playback device of claim 12, wherein the image files comprise icons associated with the digital audio sources.

14. The audio playback device of claim 10, wherein the image files are stored in compressed form on the audio playback device.

15. The audio playback device of claim 10, wherein the audio playback device is configured to send the image files to the remote control device in response to a get file request message received from the remote control device.

16. The audio playback device of claim 10, wherein the audio playback device further comprises a database that tracks which image files are stored on the remote control device.

17. The audio playback device of claim 16, wherein the database tracks which image files the remote control device has previously stored and which image files the remote control device needs from the audio playback device.

18. The audio playback device of claim 17, wherein the audio playback device is configured to update the database in response to communications from remote control device indicating that needed image files have been successfully stored on the remote control device.

19. The audio playback device of claim 10, wherein the audio playback device is configured to communicate with the remote control device via a Bluetooth LE connection.

20. The audio playback device of claim 17, wherein the audio playback device is configured to extract text from the database and render the extracted text as an image, wherein the image files comprise the rendered image of the extracted text.

* * * * *